United States Patent
Campbell et al.

(10) Patent No.: US 6,993,849 B1
(45) Date of Patent: Feb. 7, 2006

(54) CAPACITIVE BALANCE LEVELING DEVICE

(75) Inventors: Ray F. Campbell, Newport Beach, CA (US); Joan D. Wada, Anaheim, CA (US); Michael J. Costello, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/982,125

(22) Filed: Nov. 5, 2004

(51) Int. Cl.
*G01C 9/06* (2006.01)
*G01C 9/26* (2006.01)
*G01C 9/36* (2006.01)

(52) U.S. Cl. .............. 33/366.19; 33/366.12; 33/390

(58) Field of Classification Search .......... 33/366.11, 33/366.12, 366.15, 366.18, 366.19, 379, 33/390; 324/660, 663, 686
See application file for complete search history.

(56) References Cited

U.S. PATENT DOCUMENTS

| | | | | | |
|---|---|---|---|---|---|
| 2,711,590 | A | * | 6/1955 | Wilcox | 33/366.19 |
| 3,186,101 | A | * | 6/1965 | Wolpert | 33/366.22 |
| 3,290,786 | A | * | 12/1966 | Parkin | 33/366.12 |
| 4,583,296 | A | * | 4/1986 | Dell'Acqua | 33/366.12 |
| 5,079,847 | A | * | 1/1992 | Swartz et al. | 33/366.12 |
| 5,180,986 | A | * | 1/1993 | Swartz et al. | 33/366.12 |
| 5,774,996 | A | * | 7/1998 | Ogawa et al. | 33/366.12 |
| 6,449,857 | B1 | * | 9/2002 | Anikolenko | 33/366.19 |
| 6,688,013 | B2 | * | 2/2004 | Greway | 33/390 |

* cited by examiner

*Primary Examiner*—G. Bradley Bennett
(74) *Attorney, Agent, or Firm*—Artz & Artz, P.C.

(57) ABSTRACT

An aerospace system includes a leveling device defining two plane levels (yz-plane and xz-plane). The plane levels are included within an inertial measurement unit and each of the plane levels includes two capacitance controlled oscillators. Each of the capacitance controlled oscillators includes a quad capacitor bubble sensor.

36 Claims, 3 Drawing Sheets

CAPACITIVE BALANCE LEVELING DEVICE

TECHNICAL FIELD

The present invention relates generally to leveling devices and, more particularly, to a capacitive balance leveling device.

BACKGROUND ART

It is well known that aerospace systems, such as missile systems, require internal control systems for the purpose of maintaining a particular level or attitude with respect to a fixed frame, such as the earth.

Currently, spirit levels or bubble level devices are used in conjunction with missile navigation systems to maintain a particular attitude of an object prior to launch or during flight thereof.

Typical spirit levels include a closed glass tube (vial) having a circular cross section and a center line also defining a circular arc. The internal surface thereof is filled with ether or low viscosity liquid with enough free space remaining for the formation of a bubble of air and other gasses.

As was mentioned, this type of leveling device is used in aerospace or in a portion of aircraft or spacecraft navigation or guidance systems. During operation of those system types, the temperature in the operating environment of the spirit level changes over a wide range. Consequently, leveling must be measured and controlled with a high degree of accuracy over a wide range of temperatures and temperature gradients. This is often a difficult and inefficient process.

The disadvantages associated with current leveling systems have made it apparent that a new leveling system is needed. The new leveling system should substantially minimize temperature sensing requirements, and should also improve leveling detection accuracy. The present invention is directed to these ends.

SUMMARY OF THE INVENTION

In accordance with one aspect of the present invention, an aerospace system includes a leveling device defining two plane levels (yz-plane and xz-plane). The plane levels are included within an inertial measurement unit (IMU) and each plane level includes two capacitance controlled oscillators (CCOs). Each of the capacitance controlled oscillators includes a quad capacitor bubble sensor.

In accordance with another aspect of the present invention, a method for operating a leveling system includes rotating the leveling device clockwise when the first capacitance controlled oscillator signal is greater than the second capacitance controlled oscillator signal. The leveling device rotates counter-clockwise when the second capacitance controlled oscillator signal is greater than the first capacitance controlled oscillator signal.

The leveling device rotates clockwise when the third capacitance controlled oscillator signal is greater than the fourth capacitance controlled oscillator signal, and the leveling device rotates counter-clockwise when the fourth capacitance controlled oscillator signal is greater than the third dual capacitance controlled oscillator signal. In other words, the missile computer/processor controls the pre-flight profile and flight profile through the missile nozzle, steering vane actuators, or other leveling controls.

One advantage of the present invention is that it generates a dynamic range and granularity sufficient for Inter-Continental Ballistic Missile (ICBM) usage. Additional advantages include that the oscillator system consumes less power than prior oscillator systems, while dramatically improving reliability and reduction in manufacturing costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE INVENTION

The present invention is illustrated with respect to an aerospace system 10 including a capacitive balance leveling device (CBLD) 11, particularly suited to the aerospace field. The present invention is, however, applicable to various other uses that may require leveling devices, such as any system requiring initialization or stabilization measurements both at start-up and in operation under extreme conditions, as will be understood by one skilled in the art.

Figure 1:
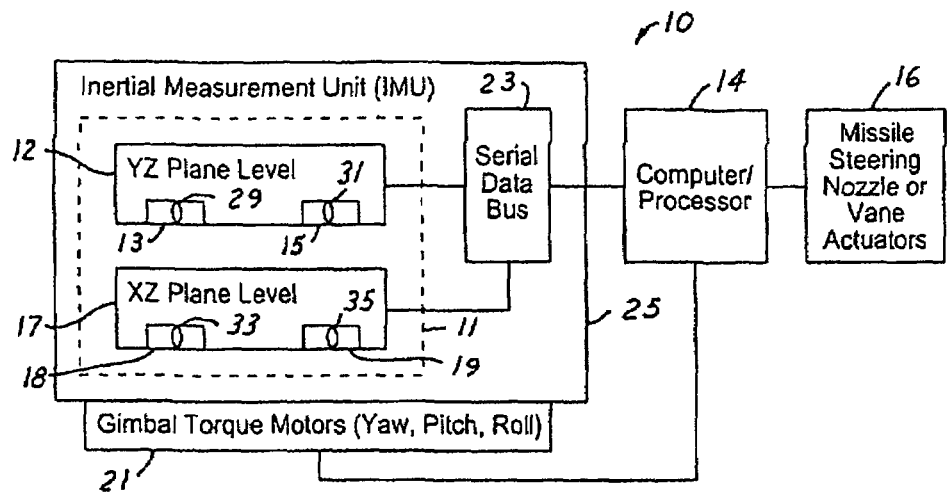
FIG. 1 illustrates an aerospace system including a leveling device in accordance with one embodiment of the present invention.

Referring to FIG. 1, the aerospace system 10 (here illustrated as a Minuteman III missile system), including a leveling device 11 defining two plane levels (yz-plane 12 and xz-plane 17), is illustrated. The aerospace system 10 is merely an illustrative example of an object requiring leveling and is not meant to be limiting. For example, the present plane levels 12 and 17 could be implemented in any accelerating object to sense leveling forces, including any type of vehicle.

The plane levels 12, 17 of the leveling device 11 are included within an inertial measurement unit 25 (IMU). In one embodiment of the present invention, the first plane level 12 includes two capacitance controlled oscillators 13, 15 (CCOs); and the second plane level 17 includes two capacitance controlled oscillators 18, 19. Each of the capacitance controlled oscillators includes a quad capacitor bubble sensor 29, 31, 33, and 35 respectively, which will be discussed regarding FIGS. 2A, 2B, 2C, and 3. Important to note is that numerous combinations of plane levels and capacitance controlled oscillators or sensors are also embodied in the present invention.

Within the leveling device 11, the yz-plane level 12 and xz-plane level 17 are coupled to a platform 21, here embodied as gimbals and gimbal torque motors (yaw, pitch or roll motors). The plane levels 12 and 17 are also coupled to a bus 23, which transfers information to a computer/processor 14. The processor 14 is also coupled to the missile steering nozzle (or vane actuators) unit 16 and the gimbal torque motors 21.

Referring to FIGS. 2A, 2B, 2C, and 3, a quad capacitor bubble sensor (e.g. 29), in accordance with one embodiment of the present invention, is illustrated. The quad capacitor bubble sensor 29 includes a glass bubble chamber 30, an upper capacitor plate 32 mounted on the bubble chamber 30, four capacitor plates 34, 36, 38, 40 disposed within the bubble chamber 30 in a substantially parallel relationship with the upper capacitor plate 32, a fluid 42 enclosed within the bubble chamber 30 and the upper capacitor plate 32, and a bubble 43 trapped between the fluid 42 and the upper capacitor plate 32.

The quad capacitor bubble sensor 29 is a bubble level that includes four capacitor plates 34, 36, 38, 40, arranged as a quad cell 44, to sense position of the edge of the bubble 43, thus measuring the position of the sensor frame of reference with respect to the center of the bubble 43. This sensor 29 can provide a precise measurement of the orientation of the plane containing the sensor frame with respect to the earth local gravity vertical.

The sensor 29 is a single variable capacitor whose value is dependent on the dielectric. The dielectric is either a fluid or a gas bubble or a combination of the two, depending on the position of the bubble 43. Because the dielectric constant of the fluid 42 differs from the dielectric constant of the bubble 43, the effective dielectric constant of the capacitor will vary as the edge of the bubble moves across the upper capacitor plate 32.

Figure 2A:
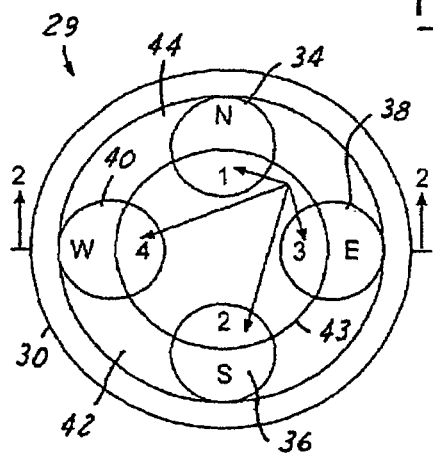
FIG. 2A illustrates a top view of a quad capacitor bubble sensor in accordance with FIG. 1.
Figure 2C:
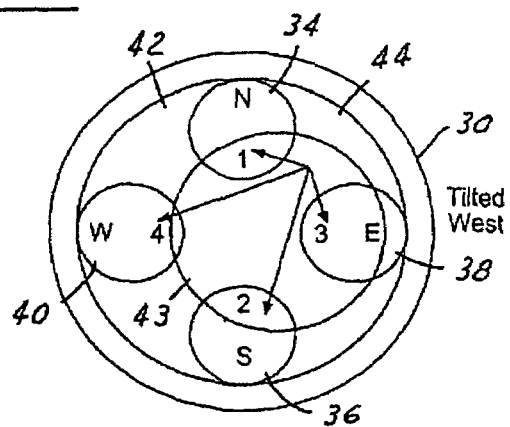
FIG. 2C illustrates a top view of the quad capacitor bubble sensor of FIG. 2A tilted West.
Figure 2B:
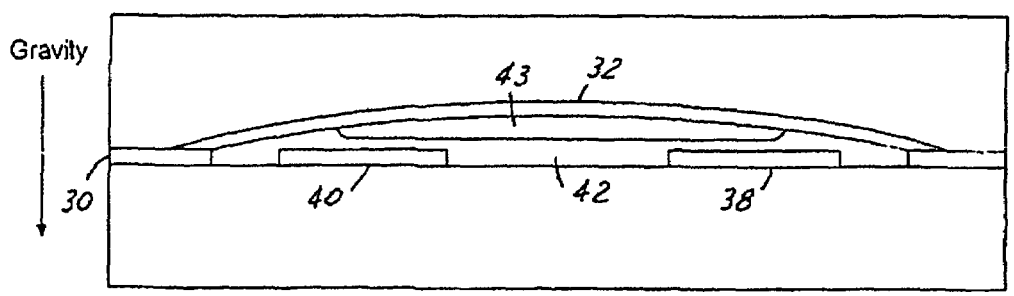
FIG. 2B illustrates a sectional view of FIG. 2A looking in the direction of line 2—2.
Figure 3:
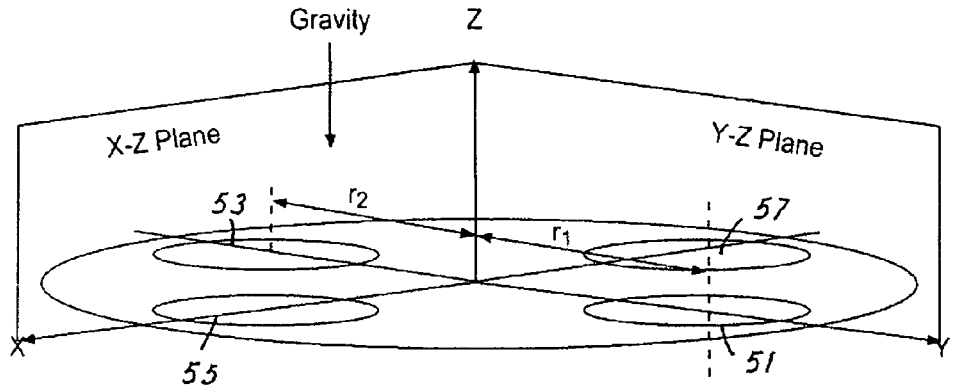
FIG. 3 illustrates a perspective view of an orientation of the capacitors of the quad capacitor bubble sensor of FIG. 2A.

The capacitive balance leveling device 11 includes the four capacitance controlled oscillators 13, 15, 18, 19, arranged as in FIG. 3. Each of the capacitance controlled oscillators 13, 15, 18, 19 includes a quad capacitor bubble sensor 29 configured as shown in FIGS. 2A, 2B, and 2C. Each capacitance controlled oscillator 13, 15, 18, 19 is an oscillator whose frequency is determined by a single variable capacitor, including the upper capacitor plate 32 in relation to the four capacitor plates 34, 36, 38, 40 and the relative variance of the position of the bubble 43 in response to axial movement of the capacitance controlled oscillators 13, 15, 18, 19, as exemplified in FIG. 2C, where the sensor 29 is tilted West.

Important to note is that for the present invention, as illustrated in FIG. 3, the distances of the capacitors to the origin, e.g. $r_1$ for the first capacitor plate and $r_2$ for the second capacitor plate, are equal, i.e. $r_1=r_2$. This is merely one embodiment, and in fact, they may be both on either side of the origin, as long as they are separated by a known distance, and at a known distance from the origin. The general apparatus of each capacitance controlled oscillator 13, 15, 18, 19 is illustrated in FIG. 4.

Figure 4:
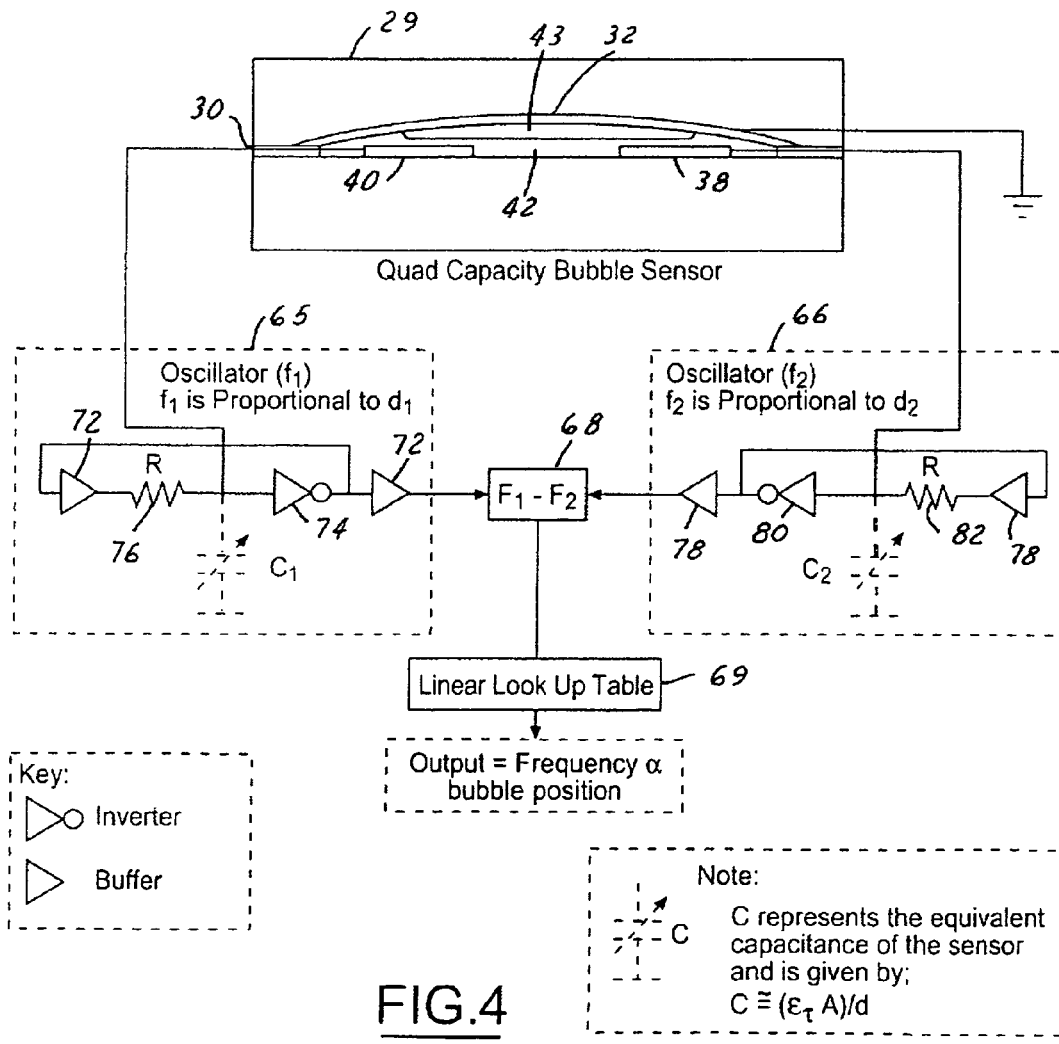
FIG. 4 illustrates a capacitance controlled oscillator system in accordance with FIG. 1.

Referring to FIG. 4, one configuration of the oscillator 13 is included as an illustrative example of the capacitance controlled oscillators 13, 15, 18, 19. The capacitance controlled oscillator 13 is part of an inertial measurement unit 13 (IMU), as was previously discussed. The oscillator 13 includes a quad capacitor bubble sensor 29, two oscillators 65, 66, a frequency subtraction device 68, and a Linear Lookup Table (LLT) or linearizer 69. The quad capacitor bubble sensor 29 generates phase shift capacitance signals in response to acceleration of the aerospace system 10, as will be discussed later.

As discussed previously, the quad capacitor bubble sensor 29 includes a bubble chamber 30, a upper capacitor plate 32, four base capacitor plates 34, 36, 38, 40, and a fluid 42 defining a bubble 43. The bubble chamber 30 is a cavity with a suitably chosen spherical radius or dome forming an upper surface 48. The dome is covered with a conducting surface 50 to provide a ground. Four capacitor plates 34, 36, 38, 40, show in FIG. 2A, are arranged symmetrically along two orthogonal axes on the bottom surface of the bubble chamber 30. Each of the plates 34, 36, 38, 40 forms a capacitor 51, 53, 55, 57 with the ground 50, and the capacitors 51, 53, 55, 57 are connected to oscillators. Important to note is that two oscillators 65, 66 are illustrated, but typically four oscillators would be included such that each capacitor 51, 53, 55, 57 is coupled to an oscillator.

The capacitance value of the capacitors 51, 53, 55, 57 is determined by the equation, $C \cong (\epsilon_r A)/d$, where $\epsilon_r$ is the relative permittivity resulting from the combination of liquid and gas between the plate and ground, A is the area of the fixed plates, and d is the effective distance between the plate and ground 50, whereby the output frequency is inversely proportional to the capacitance value.

Four capacitance controlled oscillator devices 13, 15, 18, 19 of FIG. 1, configured per FIG. 4 are required to implement the capacitive balance leveling device 11. The capacitive balance leveling device 11 is mounted on a platform 21 that can rotate about any axis. The xz surface includes controls which allow rotation of the platform 21 about, for example, the x-axis or z-axis.

Initially, the system 10 will monitor the frequency of each capacitance controlled oscillator 13, 15, 18, 19 and the result will drive the controls of each axis to result in an equal output from each pair of capacitance controlled oscillators, first and second capacitance controlled oscillators 13, 15, and third and fourth capacitance controlled oscillators 18, 19. Important to note is that in FIG. 2B, the capacitor plates 34, 36 for first and second capacitors, identified by the numbers 1 and 2 on the plates, are located opposite each other on a diameter of the bubble level chamber 30. In the example of FIG. 2C, this diameter is aligned along a north-south direction while the other capacitor plates, the third and fourth capacitance controlled oscillators 18, 19, are located opposite each other on a diameter aligned in the east-west direction. Having all the outputs from the capacitance controlled oscillators equal indicates that all four capacitors have equal capacitance and thus the bubble 43 is centered.

Calibration of the capacitance controlled oscillators 13, 15, 18, 19 will provide correction for any manufacturing differences that result in non-identical performance of the capacitors or oscillators when the bubble 43 is centered. Oscillator output deviation from the center calibrated position will create servo-loop error signals of opposite polarity. This results in unique null conditions for the control loop discussed in FIG. 5.

The capacitive balance leveling device 11 is embodied as a four level device that provides a precise measurement of the orientation of an object with respect to the earth. The leveling device 11 includes four capacitive controlled oscillators 13 (first), 15 (second), 18 (third), 19 (fourth), each of which may be configured as illustrated in FIG. 2A. Each oscillator 13, 15, 18, 19 is embodied as a single variable oscillator that can provide a reliable wide dynamic range of performance.

One embodiment of the present invention includes the capacitance controlled oscillators 13, 15, 18, 19 each having a pair of oscillators, a frequency subtraction device, and a linearizer.

The equivalent capacitor for the first capacitor 51 is illustrated in broken lines as $C_1$, and the equivalent capacitor for the second capacitor 53 is illustrated in broken lines as $C_2$.

Each capacitor is connected to a respective oscillator, e.g. 65, 66, which generates the phase shift capacitance necessary for predictable oscillation.

The first capacitor 51 is coupled to the first oscillator 65, and the second capacitor 53 is coupled to the second oscillator 66. The two oscillators 65, 66 are coupled to a frequency subtraction device 68, and the frequency subtraction device 68 is coupled to the LLT 69, which is coupled to a processor 14 (missile operations processor). The processor 14 is coupled to an actuator 16, which is coupled to various system components, such as thrusters and attitude control devices.

The embodied first oscillator 65 includes components well known in the art. Although the embodied oscillator is a common oscillator type, one skilled in the art will realize that numerous other types of oscillators will also be adaptable for the present invention. The various components include, but are not limited to, two buffers, 72, an inverter 74, and at least one resistor 76. The first oscillator 65 receives the phase shift capacitance signal from the first capacitor 51 and generates therefrom a frequency signal ($f_1$), which is proportional to change of dielectric between the upper plate 32 and the first capacitor plate 34.

The second oscillator 66 receives the phase shift capacitance signal from the second capacitor 53 and generates therefrom a second frequency signal ($f_2$), which is proportional to change of dielectric between the upper plate 32 and the second capacitor plate 36. The embodied oscillator 66 is similar to the first oscillator 65 and also includes a set of buffers 78, an inverter 80, and at least one resistor 82.

As the dielectric of one capacitor increases one or more others decrease, thereby causing one oscillator 65 to increase output frequency and another oscillator 66 to decrease output frequency.

The frequency subtraction device 68 receives the oscillator signals ($f_1$ and $f_2$ for the first and second capacitors 51, 53) and generates the difference thereof, i.e. $f_1-f_2$. Important to note is that the polarities of both $f_1$ and $f_2$ are determined before this difference is calculated. An overall frequency signal is generated from the frequency subtraction device 68.

A linearizer 69 or LLT receives the overall frequency signal. The linearizer 69 compensates for both the nonlinear function generated from the frequency subtraction device 68 and any manufacturing anomalies, as will be understood by one skilled in the art. The linearizer 69 value is established in manufacturing through taking large samples of performance curves, as will be understood by one skilled in the art. The linearizer 69 output is a digital word whose magnitude is proportional to the tilt of the system 10.

Numerous alternate linearizers are also included in the present embodiment whereby a substantially linear function can be generated by compensating for nonlinear functions, for example, in the digital domain, a digital linearizer is included. The output of the linearizer 69 is an acceleration signal multiplied by a constant (k). The overall frequency outputs for the capacitance controlled oscillators 13, 15, 18, 19 are designated by $F_1$, $F_2$, $F_3$, and $F_4$ respectively.

The processor 14 receives the output signals and generates a processor signal and response thereto. The processor 14 is embodied as a typical missile or airplane processor, as is familiar in the art.

The actuator, here embodied as missile steering nozzle or vane actuators 16 receives the processor signal and activates system components (e.g. object control devices) in response thereto. System components include for example, thrusters or attitude control devices.

The capacitance controlled oscillators 13, 15, 18, 19 are herein included on an inertial platform. The platform may be a gimbal 21 or alternate inertial platform design known in the art. The system 10 utilizes the generated signals from the oscillators 65, 66 to control the platform position to maintain a near zero rotation.

This disclosure describes the device, the signal derivations and the general control mechanism for detecting planar orientation with respect to the earth. This process is performed when the missile is at rest, prior to launch.

Figure 5:
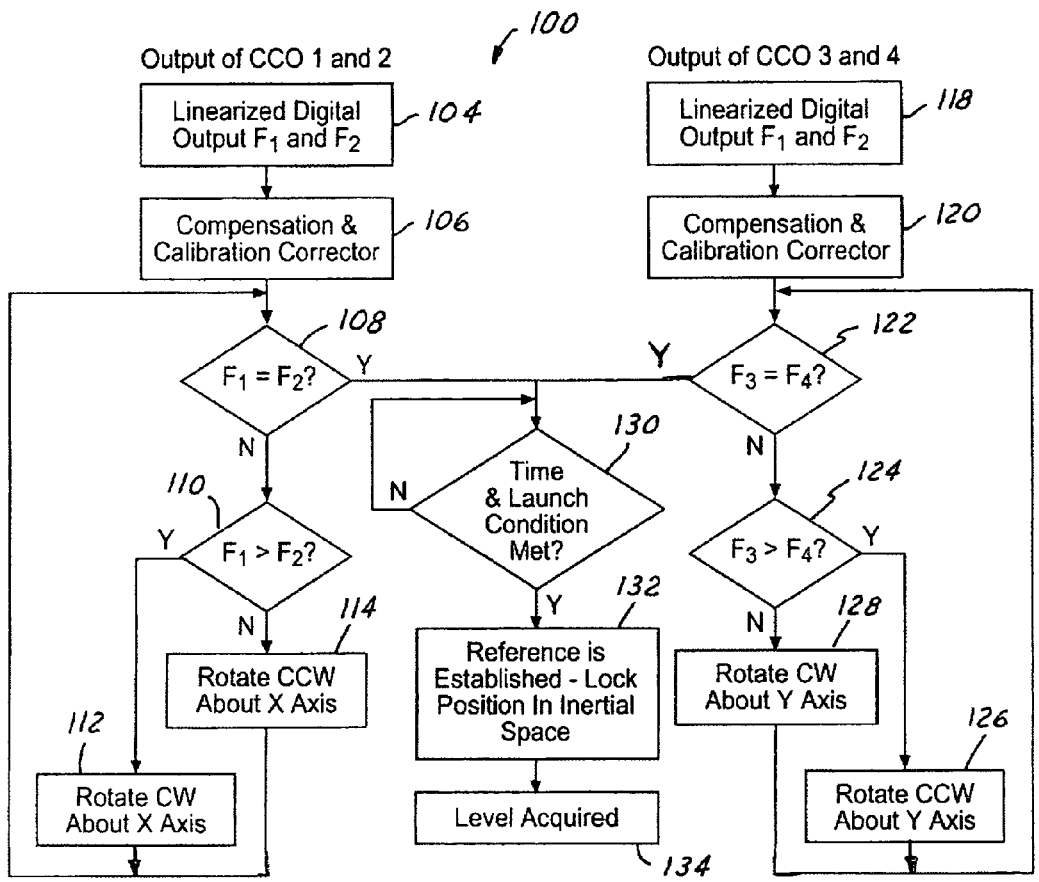
FIG. 5 illustrates a logic flow diagram of the aerospace system of FIG. 1 in operation, in accordance with another embodiment of the present invention.

Referring to FIG. 5, a logic flow diagram 100 illustrating a method for leveling control is illustrated. The logic (which may be included in the computer 14) includes two control loops, one for the xy-plane, and the other for the yz-plane.

xy-plane logic starts in operation block 104 when accelerometer outputs $f_1$ and $f_2$ are received in the processor 14. In operation block 104, the processor 14 linearizes the digital outputs, which are then designated $F_1$ and $F_2$. In operation block 106, the processor 14 compensates for signal noise and calibrates the signals using position and orientation data either obtained from other sensors or input by a technician.

In inquiry block 108, a check is made whether $F_1$ equals $F_2$. For a negative response, inquiry block 110 activates, and a check is made whether $F_1$ is greater than $F_2$. For a positive response, in operation block 112, the xy-plane rotates clockwise in response to the thrusters, other missile actuators, or platform control devices. Otherwise, in operation block 114, the xy-plane rotates counter-clockwise.

The yz-plane logic starts in operation block 116 where accelerometer outputs $F_3$ and $F_4$ are received in the processor 14. In operation block 118, the processor 14 linearizes the digital outputs $F_3$ and $F_4$. In operation block 120, the processor 14 compensates for signal noise and calibrates the signals using position and orientation data either obtained from other sensors or input by a technician.

In inquiry block 122, a check is made whether $F_3$ equals $F_4$. For a negative response, inquiry block 124 activates, and a check is made whether $F_3$ is greater than $F_4$. For a positive response, in operation block 126, the yz-plane rotates counter-clockwise through activation of the thrusters, platform control devices, or other missile actuators. Otherwise, in operation block 128, the yz-plane rotates clockwise.

For a positive response to both inquiry block 108 and inquiry block 122, in inquiry block 130, a check is made whether time and launch conditions are met. For a negative response, inquiry block 130 loops on itself until time and launch conditions are met.

Otherwise, in operation block 132, a reference is established, and the position of the missile system 10 is locked in inertial space. In operation block 134, the leveling process is complete; the missile IMU platform 21 has acquired all leveling position information, and typically, the platform 21 will be level.

In operation, a method for operating a leveling system 10 includes rotating the platform 21 and the leveling device 11 clockwise when the first capacitance controlled oscillator signal is greater than the second capacitance controlled oscillator signal. The platform 21 and the leveling device 11 rotate counter-clockwise when the second capacitance controlled oscillator signal is greater than the first capacitance controlled oscillator signal.

The platform 21 and the leveling device 11 rotate counter-clockwise when the third capacitance controlled oscillator signal is greater than the fourth capacitance controlled oscillator signal, and the platform 21 and the leveling device 11 rotate clockwise when the fourth capacitance controlled oscillator signal is greater than the third dual capacitance controlled oscillator signal.

This process is engaged when the missile is at rest, prior to launch. A calibration procedure within the processor 14 allows compensation for the offset introduced by the rotation of the earth.

As will be understood by one skilled in the art, the missile computer/processor 14 controls the pre-flight profile and flight profile through the missile nozzle, steering vane actuators, or other leveling controls.

From the foregoing, it can be seen that there has been brought to the art a new and improved level system 10. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A leveling system comprising:
   a bubble chamber enclosing a fluid and defining a bubble therein;
   an upper capacitor plate contacting at least a portion of said fluid;
   a first capacitor plate contacting said fluid and disposed in a substantially parallel relationship with said upper capacitor plate;
   a second capacitor plate contacting said fluid and disposed in a substantially parallel relationship with said upper capacitor plate coaxial with said first capacitor plate;
   a third capacitor plate contacting said fluid and disposed in a substantially parallel relationship with said upper capacitor plate;
   a fourth capacitor plate contacting said fluid and disposed in a substantially parallel relationship with said upper capacitor plate coaxial with said third capacitor plate;
   wherein movement of said bubble results in capacitance signals generated from at least two of said first capacitor plate, said second capacitor plate, said third capacitor plate, and said fourth capacitor plate; and
   a processor receiving said capacitance signals and leveling said bubble chamber in response thereto.

2. The system of claim 1 further comprising a first oscillator receiving a first capacitance signal from said first capacitor plate and generating a first frequency signal in response thereto.

3. The system of claim 2 further comprising a second oscillator receiving a second capacitance signal from said second capacitor plate and generating a second frequency signal in response thereto; and
   a frequency subtraction device subtracting said second frequency signal from said first frequency signal and generating therefrom an overall frequency signal.

4. The system of claim 3 further comprising:
   a third oscillator receiving a third capacitance signal from said third capacitor plate and generating a third frequency signal in response thereto;
   a fourth oscillator receiving a fourth capacitance signal from said fourth capacitor plate and generating a fourth frequency signal in response thereto; and
   said frequency subtraction device subtracting said fourth frequency signal from said third frequency signal and generating therefrom said overall frequency signal.

5. The system of claim 3 further comprising a linearizer receiving said overall frequency signal and generating therefrom a linearized acceleration signal including at least one of a linear or angular-tangential acceleration signal.

6. The system of claim 5 wherein said linearizer comprises at least one of a linear lookup table or a signal processor.

7. The system of claim 6 further comprising an actuator activating a system component in response to a system control signal.

8. The system of claim 7 wherein said system component comprises a thruster or an attitude control device.

9. The system of claim 1, wherein said bubble is defined as a fluid or a gas bubble or some combination thereof.

10. A method for operating a leveling system comprising:
    generating a first capacitance controlled oscillator signal from a first capacitance controlled oscillator;
    generating a second capacitance controlled oscillator signal from a second capacitance controlled oscillator;
    rotating a platform counter-clockwise when said first capacitance controlled oscillator signal is greater than said second capacitance controlled oscillator signal;
    rotating said platform clockwise when said second capacitance controlled oscillator signal is greater than said first capacitance controlled oscillator signal;
    generating a third capacitance controlled oscillator signal from a third capacitance controlled oscillator;
    generating a fourth capacitance controlled oscillator signal from a fourth capacitance controlled oscillator;
    rotating said platform counter-clockwise when said third capacitance controlled oscillator signal is greater than said fourth capacitance controlled oscillator signal; and
    rotating said platform clockwise when said fourth capacitance controlled oscillator signal is greater than said third capacitance controlled oscillator signal.

11. The method of claim 10 further comprising calibrating the leveling system in relation to the earth by rotating the system about an x-axis or a z-axis.

12. The method of claim 10 further comprising calibrating the leveling system in relation to a rotation of the earth by rotating the system about a y-axis;
    measuring effects of said rotation; and
    calibrating said effects out of future leveling calculations.

13. The method of claim 10 further comprising generating a level acquired indicator signal, and locking said level acquired indicator signal as a reference plane.

14. A leveling system comprising:
    an inertial measurement unit;
    a platform coupled to said inertial measurement unit and defining an xz-plane;
    a capacitance controlled oscillator;
    a first capacitance controlled oscillator within said inertial measurement unit comprising a first quad bubble sensor and generating a first digital word signal;

a second capacitance controlled oscillator within said inertial measurement unit comprising a second quad bubble sensor and generating a second digital word signal;

a third capacitance controlled oscillator within said inertial measurement unit comprising a third quad bubble sensor and generating a third digital word signal;

a fourth capacitance controlled oscillator within said inertial measurement unit comprising a fourth quad bubble sensor and generating a fourth digital word signal;

an actuator activating an object control device in response to a platform control signal; and a processor receiving said first digital word signal, said second digital word signal, said third digital word signal and said fourth digital word signal and generating said platform control signal in response thereto, wherein said platform control signal is generated as a function of logic comprising rotating said platform clockwise when said first digital word signal is greater than said second digital word signal, rotating said platform counter-clockwise when said second digital word signal is greater than said first digital word signal, rotating said platform counter-clockwise when said third digital word signal is greater than said fourth digital word signal, and rotating said platform clockwise when said fourth digital word signal is greater than said digital word signal.

15. The system of claim 14 wherein said object control device comprises at least one of a thruster, an attitude control device, a missile steering nozzle, or a vane actuator.

16. The system of claim 14, wherein said second and third capacitance controlled oscillator are arranged with said first capacitance controlled oscillator to receive cross axis thrust data.

17. The system of claim 16 further comprising a filter reducing noise in said first digital word signal in a time domain.

18. The system of claim 16, wherein said processor calibrates the leveling system in relation to the earth by generating a rotation signal to rotate the leveling system about an x-axis or a z-axis, said processor further generating a signal to rotate the leveling system about a y-axis in response to a rotation of the earth, said processor further measuring effects of said rotation about x-axis, said y-axis, or said z-axis, said processor still further calibrating said effects out of future leveling calculations.

19. The system of claim 18, wherein said processor further generates a level acquired indicator signal in response to said first capacitance controlled oscillator, said second capacitance controlled oscillator, said third capacitance controlled oscillator, and said fourth capacitance controlled oscillator all equal, said processor further locking said level acquired indicator signal as a reference plane.

20. A method for operating a leveling system comprising:
generating a first sensor signal as a function of movement of a first bubble in an East-West direction with respect to local gravity;
generating a second sensor signal as a function of movement of a second bubble in a North-South direction with respect to said local gravity;
rotating a platform in response to said first sensor signal; and
rotating said platform in response to said second sensor signal.

21. The method of claim 20, wherein generating said first sensor signal further comprises generating a first capacitance controlled oscillator signal from a first capacitance controlled oscillator.

22. The method of claim 21, wherein generating said first sensor signal further comprises generating a second capacitance controlled oscillator signal from a second capacitance controlled oscillator.

23. The method of claim 20, wherein generating said second sensor signal further comprises generating a third capacitance controlled oscillator signal from a third capacitance controlled oscillator.

24. The method of claim 23, wherein generating said second sensor signal further comprises generating a fourth capacitance controlled oscillator signal from a fourth capacitance controlled oscillator.

25. The method of claim 24, wherein rotating said platform in response to said second sensor signal further comprises rotating said platform clockwise when said third capacitance controlled oscillator signal is greater than said fourth capacitance controlled oscillator signal; and rotating said platform counter-clockwise when said fourth capacitance controlled oscillator signal is greater than said third capacitance controlled oscillator signal.

26. The method of claim 20 further comprising calibrating the leveling system in relation to the earth by rotating the system about an x-axis or a z-axis.

27. The method of claim 20 further comprising calibrating the leveling system in relation to a rotation of the earth by rotating the system about a y-axis;
measuring effects of said rotation; and
calibrating said effects out of future leveling calculations.

28. The method of claim 20 further comprising generating a level acquired indicator signal, and locking said level acquired indicator signal as a reference plane.

29. A leveling system comprising:
an inertial measurement unit;
a platform coupled to said inertial measurement unit and defining an xz-plane;
a first capacitance controlled oscillator within said inertial measurement unit comprising a first quad bubble sensor and generating a first sensor signal as a function of movement of a first bubble in an East-West direction with respect to local gravity;
a second capacitance controlled oscillator within said inertial measurement unit comprising a second quad bubble sensor and generating a second sensor signal as a function of movement of a second bubble in a North-South direction with respect to said local gravity;
an actuator activating an object control device in response to a platform control signal; and
a processor receiving said first sensor signal, said second sensor signal and generating said platform control signal in response thereto,
wherein said platform control signal is generated as a function of logic comprising rotating said platform in response to said first sensor signal; and rotating said platform in response to said second sensor signal.

30. The system of claim 29 further comprising a third capacitance controlled oscillator within said inertial measurement unit comprising a third quad bubble sensor and generating a third sensor signal, wherein said processor rotates said platform in response to said third sensor signal.

31. The system of claim 30 further comprising a fourth capacitance controlled oscillator within said inertial measurement unit comprising a fourth quad bubble sensor and generating a fourth sensor signal, wherein said processor rotates said platform in response to said third sensor signal.

32. The system of claim 31, wherein said second and third capacitance controlled oscillator are arranged with said first capacitance controlled oscillator to receive cross axis thrust data.

33. The system of claim 31, wherein said processor further generates a level acquired indicator signal in response to said first capacitance controlled oscillator, said second capacitance controlled oscillator, said third capacitance controlled oscillator, and said fourth capacitance controlled oscillator all equal, said processor further locking said level acquired indicator signal as a reference plane.

34. The system of claim 29 wherein said object control device comprises at least one of a thruster, an attitude control device, a missile steering nozzle, or a vane actuator.

35. The system of claim 29 further comprising a filter reducing noise in said first digital word signal in a time domain.

36. The system of claim 29, wherein said processor calibrates the leveling system in relation to the earth by generating a rotation signal to rotate the leveling system about an x-axis or a z-axis, said processor further generating a signal to rotate the leveling system about a y-axis in response to a rotation of the earth, said processor further measuring effects of said rotation about said x-axis, said y-axis, or said z-axis, said processor still further calibrating said effects out of future leveling calculations.

* * * * *